United States Patent
Pesto, Jr. et al.

(10) Patent No.: US 6,518,971 B1
(45) Date of Patent: Feb. 11, 2003

(54) GRAPHICS PROCESSING SYSTEM WITH MULTIPLE STRIP BREAKERS

(75) Inventors: William S. Pesto, Jr., Madison, AL (US); Russell Schroter, Madison, AL (US); David Young, Orlando, FL (US)

(73) Assignee: 3Dlabs Inc. Ltd., Hamilton (BM)

( * ) Notice: Subject to any disclaimer, the term of this patent is extended or adjusted under 35 U.S.C. 154(b) by 0 days.

(21) Appl. No.: 09/353,912

(22) Filed: Jul. 15, 1999

Related U.S. Application Data

(60) Provisional application No. 60/093,181, filed on Jul. 17, 1998.

(51) Int. Cl.[7] .............................................. G06F 15/80
(52) U.S. Cl. ...................................................... 345/505
(58) Field of Search ................................. 345/505, 506, 345/502, 503, 501

(56) References Cited

U.S. PATENT DOCUMENTS

| | | | |
|---|---|---|---|
| 4,434,437 A | 2/1984 | Strolle et al. ................ 358/140 |
| 4,615,013 A | 9/1986 | Yan et al. .................... 364/521 |
| 4,646,232 A | 2/1987 | Chang et al. ................ 523/445 |
| 4,908,780 A | 3/1990 | Priem et al. ................. 364/521 |
| 4,918,626 A | 4/1990 | Watkins et al. ............. 364/522 |
| 4,991,122 A | 2/1991 | Sanders ....................... 364/521 |
| 5,107,415 A | 4/1992 | Sato et al. ................... 395/800 |
| 5,123,085 A | 6/1992 | Wells et al. ................. 395/121 |
| 5,239,654 A | 8/1993 | Ing-Simmons et al. ..... 395/800 |
| 5,287,438 A | 2/1994 | Kelleher ...................... 395/132 |
| 5,293,480 A | 3/1994 | Miller et al. ................ 395/163 |
| 5,313,551 A | 5/1994 | Labrousse ................... 395/425 |
| 5,363,475 A | 11/1994 | Baker et al. ................. 395/122 |
| 5,371,840 A | 12/1994 | Fischer et al. .............. 395/133 |
| 5,394,524 A | 2/1995 | DiNicola et al. ........... 395/163 |
| 5,398,328 A | 3/1995 | Weber et al. ................ 395/500 |
| 5,446,479 A | 8/1995 | Thompson et al. ......... 345/139 |
| 5,485,559 A | 1/1996 | Sakaibara et al. .......... 395/133 |
| 5,511,165 A | 4/1996 | Brady et al. ............ 395/200.01 |
| 5,519,823 A | 5/1996 | Barkans ....................... 395/143 |
| 5,533,170 A * | 7/1996 | Teitzel et al. ................ 345/502 |
| 5,544,294 A | 8/1996 | Cho et al. .................... 395/141 |
| 5,555,359 A | 9/1996 | Choi et al. ................... 395/141 |
| 5,557,734 A | 9/1996 | Wilson ........................ 395/162 |
| 5,561,749 A | 10/1996 | Schroeder .................... 395/120 |
| 5,572,713 A | 11/1996 | Weber et al. ................ 395/500 |
| 5,581,673 A * | 12/1996 | Kikuchi ....................... 345/423 |
| 5,613,050 A * | 3/1997 | Hochmuth et al. .......... 345/422 |
| 5,631,693 A | 5/1997 | Wunderlich et al. ............ 348/7 |
| 5,664,114 A | 9/1997 | Krech, Jr. et al. ....... 395/200.64 |
| 5,666,520 A | 9/1997 | Fujita et al. ................. 345/513 |
| 5,684,939 A | 11/1997 | Foran et al. ................. 395/131 |

(List continued on next page.)

FOREIGN PATENT DOCUMENTS

| | | |
|---|---|---|
| EP | 0 311 798 A2 | 4/1989 |
| EP | 0 397 180 A2 | 11/1990 |
| EP | 0 438 194 A2 | 7/1991 |

(List continued on next page.)

OTHER PUBLICATIONS

Iwashita, et al., "A Fine Grained Data Flow Machine and Its Concurrent Execution Mechanism" NEC Res. & Develop., No. 93, Apr. 1989, pp. 63–72.

(List continued on next page.)

*Primary Examiner*—Kee M. Tung
(74) *Attorney, Agent, or Firm*—Bockhop & Reich, LLP

(57) ABSTRACT

A graphics accelerator having first and second processors includes a first vertex breaker unit coupled to the first processor, and a second vertex breaker unit coupled to the second processor. The first breaker unit divides an incoming polygon strip into a first set of substrips, while the second breaker unit divides the incoming polygon strip into a second set of substrips. The graphics accelerator further includes a bus coupled with the first and second breaker units for transmitting the incoming polygon strip to the first breaker unit and the second breaker unit.

25 Claims, 7 Drawing Sheets

U.S. PATENT DOCUMENTS

| | | | | |
|---|---|---|---|---|
| 5,701,365 | A | | 12/1997 | Harrington et al. .......... 382/212 |
| 5,706,481 | A | | 1/1998 | Hannah et al. ............. 395/519 |
| 5,721,812 | A | | 2/1998 | Mochizuki ................... 395/110 |
| 5,737,455 | A | | 4/1998 | Harrington et al. ......... 382/284 |
| 5,757,375 | A | | 5/1998 | Kawase ....................... 345/429 |
| 5,757,385 | A | | 5/1998 | Narayanaswami et al. .. 345/505 |
| 5,764,237 | A | | 6/1998 | Kaneko ....................... 345/430 |
| 5,821,950 | A | | 10/1998 | Rentschler et al. ......... 345/505 |
| 5,841,444 | A | | 11/1998 | Mun et al. ................... 345/506 |
| 5,870,567 | A | | 2/1999 | Hausauer et al. ........... 395/281 |
| 5,883,641 | A | | 3/1999 | Krech, Jr. et al. .......... 345/505 |
| 5,914,711 | A | | 6/1999 | Mangerson et al. ........ 345/203 |
| 6,078,331 | A | * | 6/2000 | Pulli et al. ................... 345/423 |
| 6,157,393 | A | * | 12/2000 | Potter et al. ................. 345/505 |
| 6,188,410 | B1 | * | 2/2001 | Brethour et al. ............ 345/501 |
| 6,320,596 | B1 | * | 11/2001 | Bestimt et al. ............. 345/619 |

FOREIGN PATENT DOCUMENTS

| | | |
|---|---|---|
| EP | 0 448 286 A2 | 9/1991 |
| EP | 0 463 700 A2 | 1/1992 |
| EP | 0 566 229 A2 | 10/1993 |
| EP | 0 627 682 A1 | 12/1994 |
| EP | 0 631 252 A2 | 12/1994 |
| EP | 0 693 737 A2 | 1/1996 |
| EP | 0 734 008 A1 | 9/1996 |
| EP | 0 735 463 A2 | 10/1996 |
| EP | 0 810 553 A2 | 12/1997 |
| EP | 0 817 009 A2 | 1/1998 |
| EP | 0 825 550 A2 | 2/1998 |
| EP | 0 840 279 A2 | 5/1998 |
| WO | WO 86/07646 | 12/1986 |
| WO | WO 92/00570 | 1/1992 |
| WO | WO 93/06553 | 4/1993 |
| WO | WO 97/21192 | 6/1997 |

OTHER PUBLICATIONS

Fujita, et al., "A Dataflow Image Processing System TIP–4", Proceedings of the 5$^{th}$ International Conference on Image Analysis and Processing, pp. 735–741.

Rathman, et al., "Processing the New World of Interactive Media", IEEE Signal Processing Magazine 1053–5888/98/ 510.00 Copyright Mar. 1998, vol. 15, No. 2, XP–002121705, pp. 1080–117.

IBM Technical Disclosure Bulletin "Effective Cache Mechanism for Texture Mapping" vol. 39, No. 12, Dec. 1996, XP–002065152, pp. 213, 215, and 217.

"Advanced Raster Graphics Architecture" XP–002118066, pp. 890–893.

IBM Technical Disclosure Bulletin "Data Format Conversion: Intel/Non–Intel", vol. 33, No. 1A, Jun. 1990, XP–000117784, pp. 420–427.

IBM Technicla Disclosure Bulletin "Address Munging Support in a Memory Controller/PCI Host Bridge for the PowerPC 603 CPU Operating in 32–Bit Data Mode" vol. 38,. No. 09, Sep. 1995, XP–000540250, pp. 237–240.

Auel, K., "One frame ahead: frame buffer management for animation and real–time graphics", Presented at Computer Graphics: Online Publications, Pinner, Middlesex, UK, 1988, XP–000749898, pp. 43–50.

Abram, et al., "Efficient Alias–free Rendering using Bit-–masks and Look–up Tables", San Francisco, Jul. 22–26, vol. 19, No. 13, 1985, XP–002115680, pp. 53–59.

Schilling, A., "A New and Efficient Antialiasing with Sub-pixel Masks" XP–000562430, pp. 133–141.

Ueda, H., et al., "A Multiprocessor System Utilizing Enhanced DSP's For Image Processing", Central Research Laboratory, Hitachi, Ltd., 1988 IEEE, XP–2028756, pp. 611–620.

Cook, R.L., et al., "The Reyes Image Rendering Architecture", Computer Graphics, vol. 21, No. 4, Jul. 1987, XP–000561437, pp. 95–102.

Haeberli, P., et al., "The Accumulation Buffer: Hardware Support for High–Quality Rendering", Computer Graphics, vol. 24, No. 4, Aug. 1990, XP–000604382, pp. 309–318.

Watt, A., et al., "Advanced Animation and Rendering Techniques Theory and Practice", ACM Press, NY, pp. 127–137.

Carpenter, L., "The A–buffer, an Antialiased Hidden Surface Method", Computer Graphics, vol, 18, No. 3, Jul., 1984, pp. 13–18.

\* cited by examiner

GRAPHICS PROCESSING SYSTEM WITH MULTIPLE STRIP BREAKERS

PRIORITY

This application claims priority from U.S. provisional patent applicatiion Ser. No. 60/093,181, filed Jul. 17, 1998, entitled "GRAPHICS PROCESSING SYSTEM WITH MULTIPLE STRIP BREAKERS" and bearing, the disclosure of which is incorporated herein, in its entirety, by reference.

FIELD OF THE INVENTION

The invention generally relates to computer systems and, more particularly, the invention relates to processing graphics request data for display on a computer display device.

BACKGROUND OF THE INVENTION

Three dimensional graphics request data commonly is processed in a computer system as a plurality of polygons having vertices. Each of the vertices has associated attribute data (e.g., color, transparency, depth, etc . . .) that is utilized to rasterize pixels on a computer display device. Vertices commonly are processed by computer systems as a plurality of contiguous polygons, known in the art as "polygon strips."

Many computer systems utilize a graphics accelerator for processing incoming polygon strips. Moreover, graphics accelerators commonly include a plurality of parallel processors for processing different portions (i. e., substrips) of incoming polygon strips. To that end, accelerators with parallel processors typically include a single polygon strip breaker for dividing the incoming polygon strip into a plurality of substrips. The substrips may be distributed to each of the processors in any convenient manner such as, for example, in a round-robin fashion. Each processor thus processes different substrips. Breaking a polygon strip, however, requires that certain vertices at the boundaries of substrips be processed by two processors. Accordingly, more data is transmitted from a single breaker than is received. This can slow processing by the graphics accelerator.

SUMMARY OF THE INVENTION

In accordance with one aspect of the invention, a graphics accelerator having first and second processors includes a first vertex breaker unit ("first breaker") coupled to the first processor, and a second vertex breaker unit ("second breaker") coupled to the second processor. The first breaker divides an incoming polygon strip into a first set of substrips, while the second breaker divides the incoming polygon strip into a second set of substrips. The graphics accelerator further includes a bus coupled with the first and second breakers for transmitting the incoming polygon strip to the first breaker and the second breaker.

The first processor produces a first set of output substrips, and the second processor produces a second set of output substrips. In preferred embodiments, the graphics accelerator further has a first sequencer for sequencing the first set of output substrips into a preselected order. The first breaker may include a sequence number generator for applying a sequence number to each of the substrips in the first set of substrips. In a similar manner, the graphics accelerator also may include a second sequencer for sequencing the second set of substrips. In preferred embodiments, the first set of substrips and second set of substrips include no common substrips.

In other embodiments of the invention, the first processor includes a plurality of first subprocessors, where each of the first subprocessors has a current workload. The current workload of a given subprocessor preferably is the total number of substrips that the given subprocessor is processing at a current time. The first breaker directs each substrip in the first set of substrips to the plurality of subprocessors based upon each of the current workloads of each of the plurality of first subprocessors. In preferred embodiments, the first breaker directs substrips to the one of the first subprocessors with the smallest current workload.

In preferred embodiments, the first breaker includes a counter for determining when to divide the incoming polygon strip for processing by the first processor. The first breaker may include an input for receiving the incoming polygon strip (having a first size), and an output for transmitting output data having a second size. The first size preferably is greater than the second size.

In accordance with other aspects of the invention, a graphics accelerator for processing an incoming polygon strip includes a first processor, a second processor, a first breaker coupled with the first processor for dividing the incoming polygon into a first set of substrips, and a second breaker coupled with the second processor for dividing the incoming polygon strip into a second set of substrips. The first breaker has a first input for receiving the incoming polygon strip, and the second breaker has a second input for receiving the incoming polygon strip. In preferred embodiments, the first set of substrips is different from the second set of substrips.

In yet other aspects of the invention, a graphics accelerator for processing an incoming polygon strip includes a plurality of strip processors, and a plurality of breakers, where each of the breakers receives the incoming polygon strip. Each strip processor preferably includes a breaker for breaking the incoming polygon strip into a set of substrips and processes sets of substrips that are different than the sets of substrips processed by the other strip processors.

In preferred embodiments, each of the breakers includes a sequencer for sequencing substrips in a preselected order. The preselected order for a given strip processor is the order that the substrips are received by the given strip processor.

BRIEF DESCRIPTION OF THE DRAWINGS

The foregoing and other objects and advantages of the invention will be appreciated more fully from the following further description thereof with reference to the accompanying drawings wherein.

DESCRIPTION OF PREFERRED EMBODIMENTS

Figure 1:
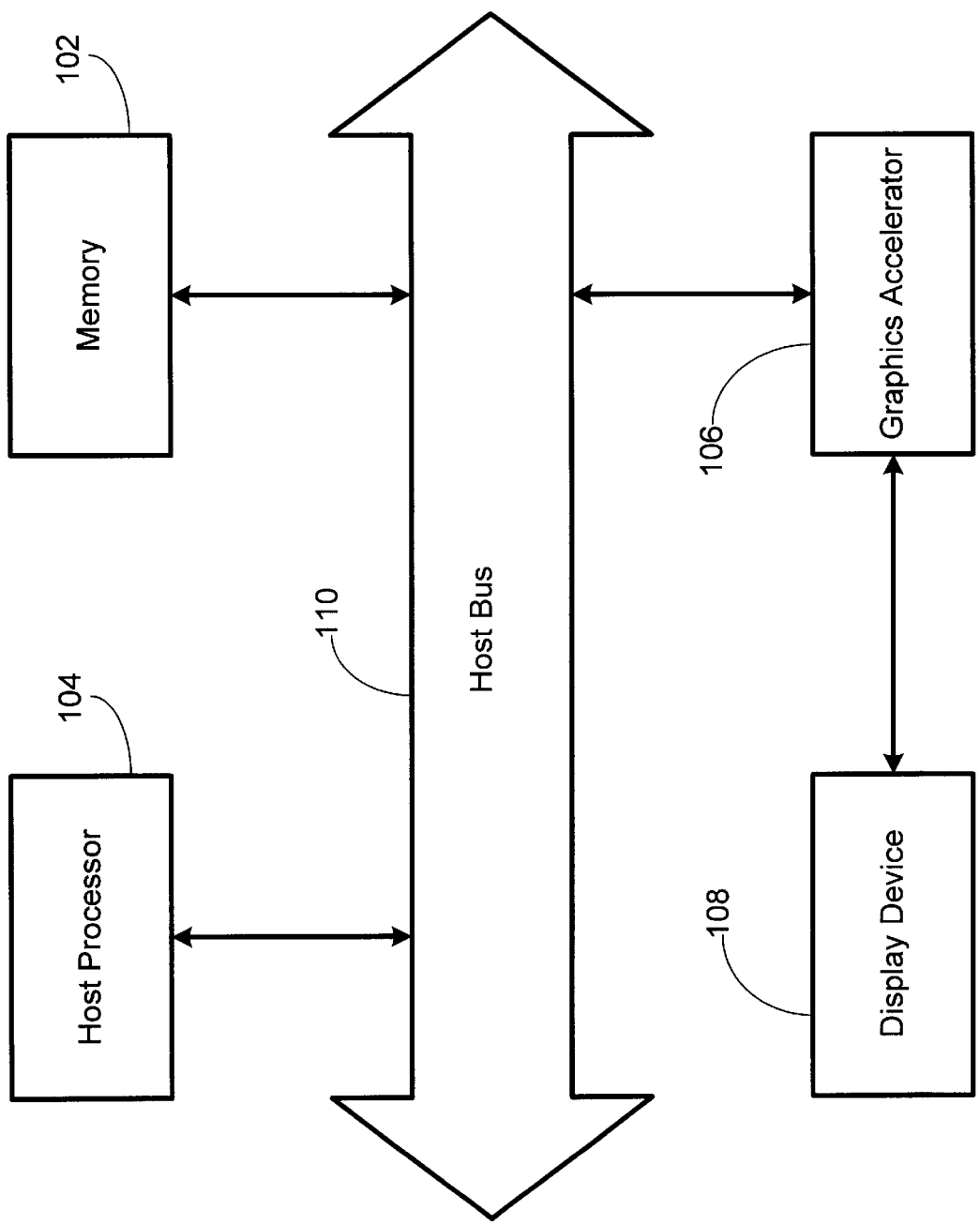
FIG. 1 schematically shows a portion of an exemplary computer system on which preferred embodiments of the invention may be implemented.

FIG. 1 schematically shows a portion of an exemplary computer system 100 on which preferred embodiments of the invention may be implemented. More particularly, the computer system 100 includes a host processor 104 (i.e., a central processing unit) for executing application level programs and system functions, volatile host memory 102 for short term data storage (i.e., random access memory), a graphics accelerator 106 for processing graphics request code in accord with preferred embodiments of the invention (see FIGS. 5–6), and a bus 110 coupling all of the prior noted elements of the system 100. In addition, the system 100 further includes a display device 108, coupled to the graphics accelerator 106, for displaying the graphics request code processed by the accelerator 106. The graphics accelerator 106 preferably utilizes any well known graphics processing application program interface such as, for example, the OPENGL™ application program interface (available from Silicon Graphics, Inc. of Mountain View, Calif. for processing three dimensional ("3D") and two dimensional ("2D") graphical request code. In preferred embodiments, the host processor 104 executes a graphical drawing application program such as, for example, the PLANT DESIGN SYSTEM™ drawing program, available from Intergraph Corporation of Huntsville, Ala.

Figure 2:
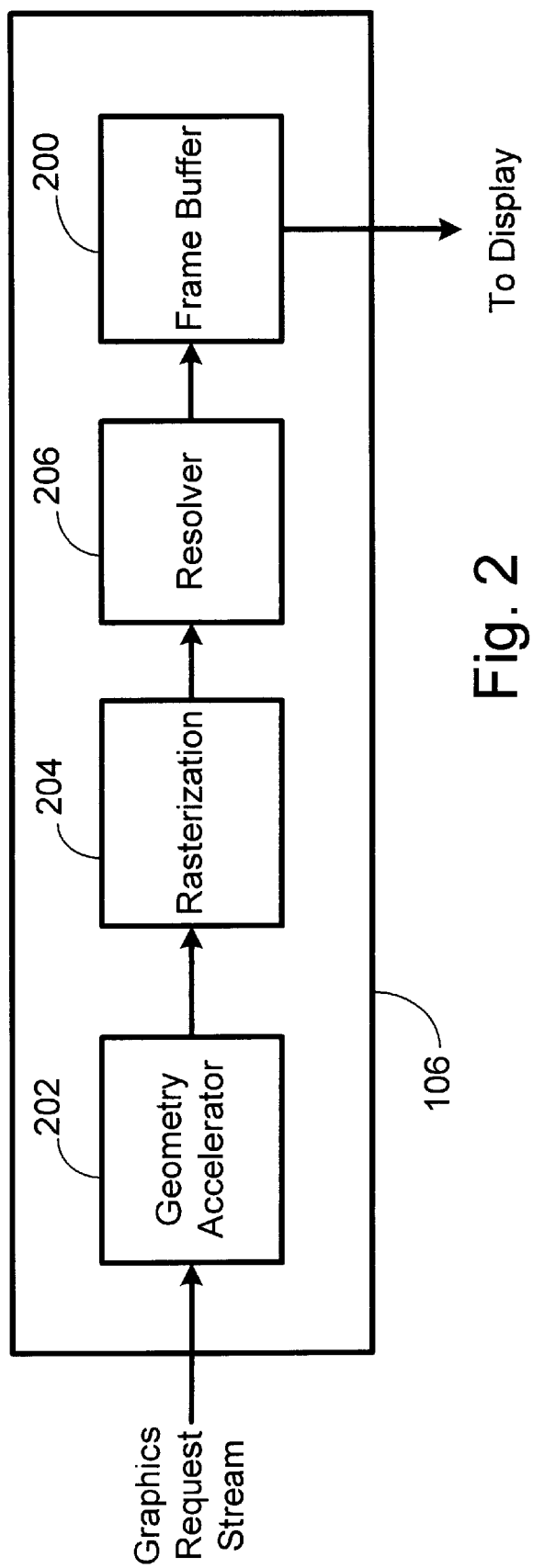
FIG. 2 schematically shows a graphics accelerator that may be included in the computer system shown in FIG. 1.

FIG. 2 shows several elements of a graphics processing pipeline that make up the graphics accelerator 106. In preferred embodiments, the graphics accelerator 106 includes a double buffered frame buffer 200 (i.e., having a back buffer and a front buffer) for storing the processed graphics request code in accord with the OPENGL™ interface. Among other things, the graphics accelerator 106 also preferably includes a geometry accelerator stage 202 for performing geometry operations that commonly are executed in graphics processing (e.g., converting vertex data from world space to screen space), a rasterizer stage 204 for rasterizing pixels on the display device 108, and a resolver stage 206 for storing data in the frame buffer 200 and transmitting data from the frame buffer 200 to the display device 108. As noted above, the graphics accelerator 106 preferably is adapted to process both 2D and 3D graphical data.

Figure 3:
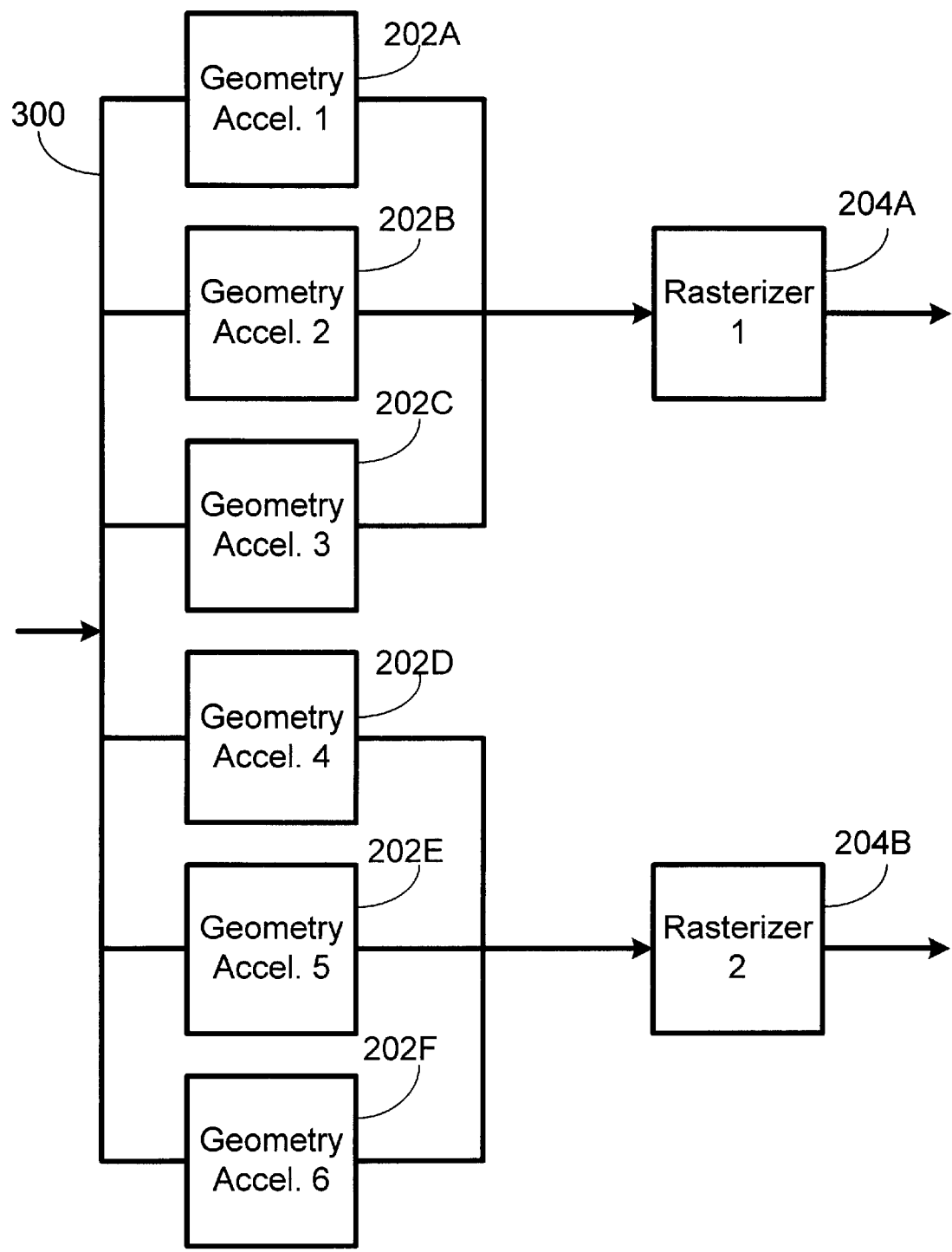
FIG. 3 schematically shows one embodiment of a graphics accelerator stage and a rasterization stage of the graphics accelerator shown in FIG. 2.

FIG. 3 schematically shows one embodiment of the geometry accelerator stage 202 and the rasterization stage 204 in the graphics accelerator 106 shown in FIG. 2. In this embodiment, the geometry acceleration stage includes six separate geometry accelerators 102A–102F that feed the rasterizer stage 204. As shown in FIG. 3, the rasterizer stage 204 may include first and second rasterizers 204A and 204B that respectively receive processed vertex data from three geometry accelerators 202A–C and 202D–F. More particularly, the first rasterizer 204A receives data from first, second, and third parallel geometry accelerators 202A–202C, while the second rasterizer 204B receives data from fourth, fifth, and sixth parallel geometry accelerators 202D–202F. Each of the six parallel geometry accelerators 202A–202F is coupled with a receive bus 300 (FIGS. 3 and 4) and thus, each receives an entire polygon strip for processing.

It should be noted, however, that different numbers of geometry accelerators 202 and rasterizers 204 may be used in accord with preferred embodiments of the invention. For example, alternative embodiments utilize a single geometry accelerator 202 per rasterizer 204.

Figure 4:
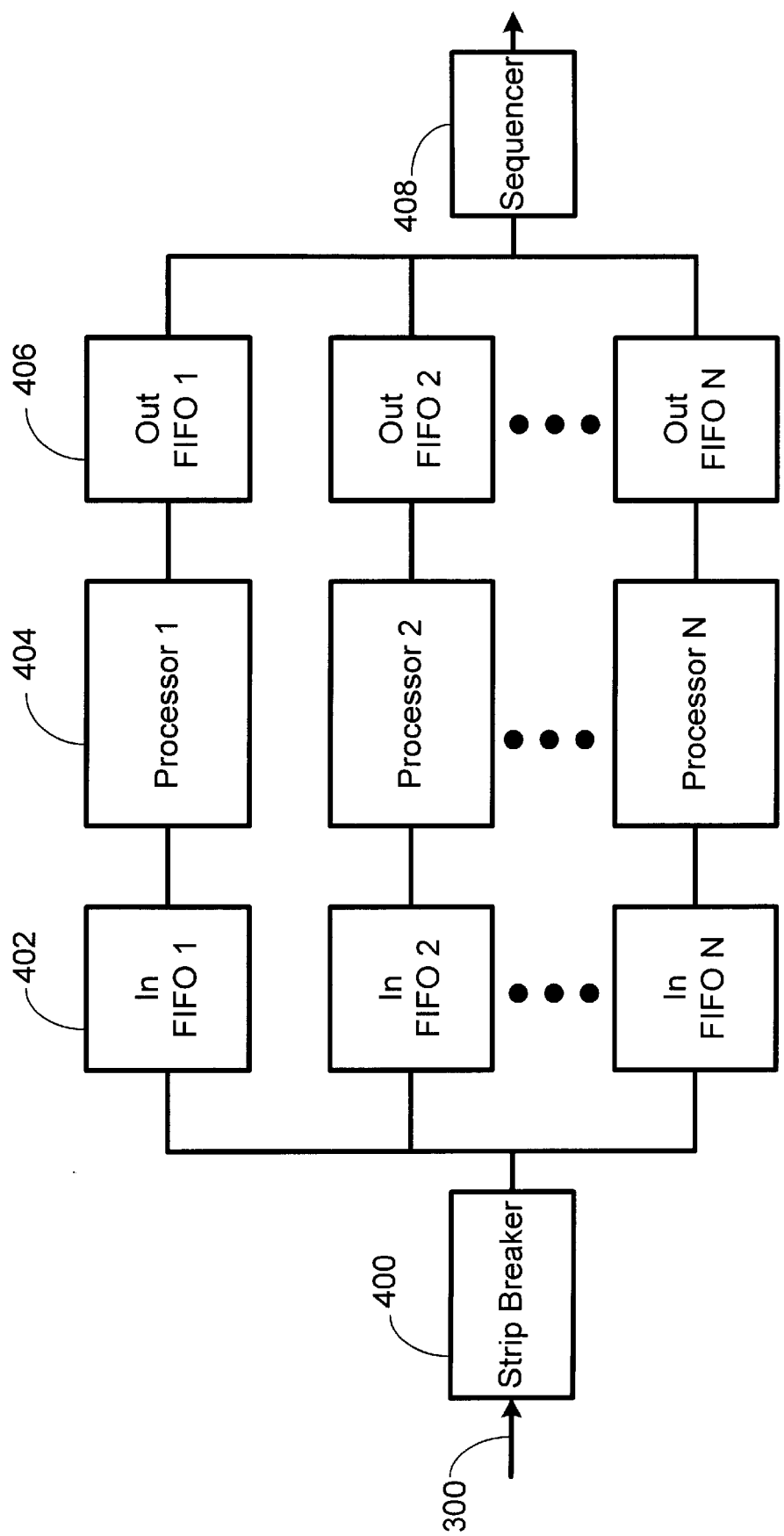
FIG. 4 schematically shows one embodiment of a geometry accelerator configured in accordance with a preferred embodiment of the invention.

FIG. 4 schematically shows one embodiment of an exemplary geometry accelerator 202 such as, for example, one of the first through sixth geometry accelerators 202A–202F. The geometry accelerator 202 includes a strip breaker 400 coupled to the receive bus 300 for both receiving and breaking the incoming polygon strip into a plurality of substrips, a plurality of parallel polygon strip processors 404 with accompanying buffering 402 and 406, and a sequencer 408 for sequencing processed polygon strips received from the parallel polygon strip processors 404. Each polygon strip processor 404 includes an input buffer 402 (e.g., a first in, first out buffer) for receiving substrip data, and an output buffer 406 (e.g., also a first in, first out buffer) for temporarily storing processed vertex substrip data. In addition to breaking an incoming polygon strip into substrips for use in its accompanying geometry accelerator 202, the strip breaker 400 assigns a sequence number to each substrip prior to delivering the substrips to the parallel strip processors 404. As discussed below, those sequence numbers are used by the sequencer 408 to ensure that the substrips are transmitted from the geometry accelerator 202 in the sequence received.

Although the strip breaker 400 receives an entire polygon strip, it processes selected substrips of such received polygon strip (discussed below in greater detail). Accordingly, in many embodiments, the strip breaker 400 receives more data than it transmits to its associated input buffers 402. For example, in a two geometry accelerator system that receives a polygon strip having one thousand vertices, the breaker 400 in each geometry accelerator 202 processes every other set of input vertices, such as every other ten vertices. Accordingly, in such a system, the strip breaker 400 for one geometry accelerator 202 processes the substrips defined by vertices 0–9, 20–29, 40–49, etc . . . and delivers those substrips to one of its input buffers 402, while the strip breaker 400 for the other geometry accelerator 202 processes the substrips defined by vertices 10–19, 30–39, 50–59, etc . . . and delivers those substrips to one of its input buffers 402.

Figure 5:
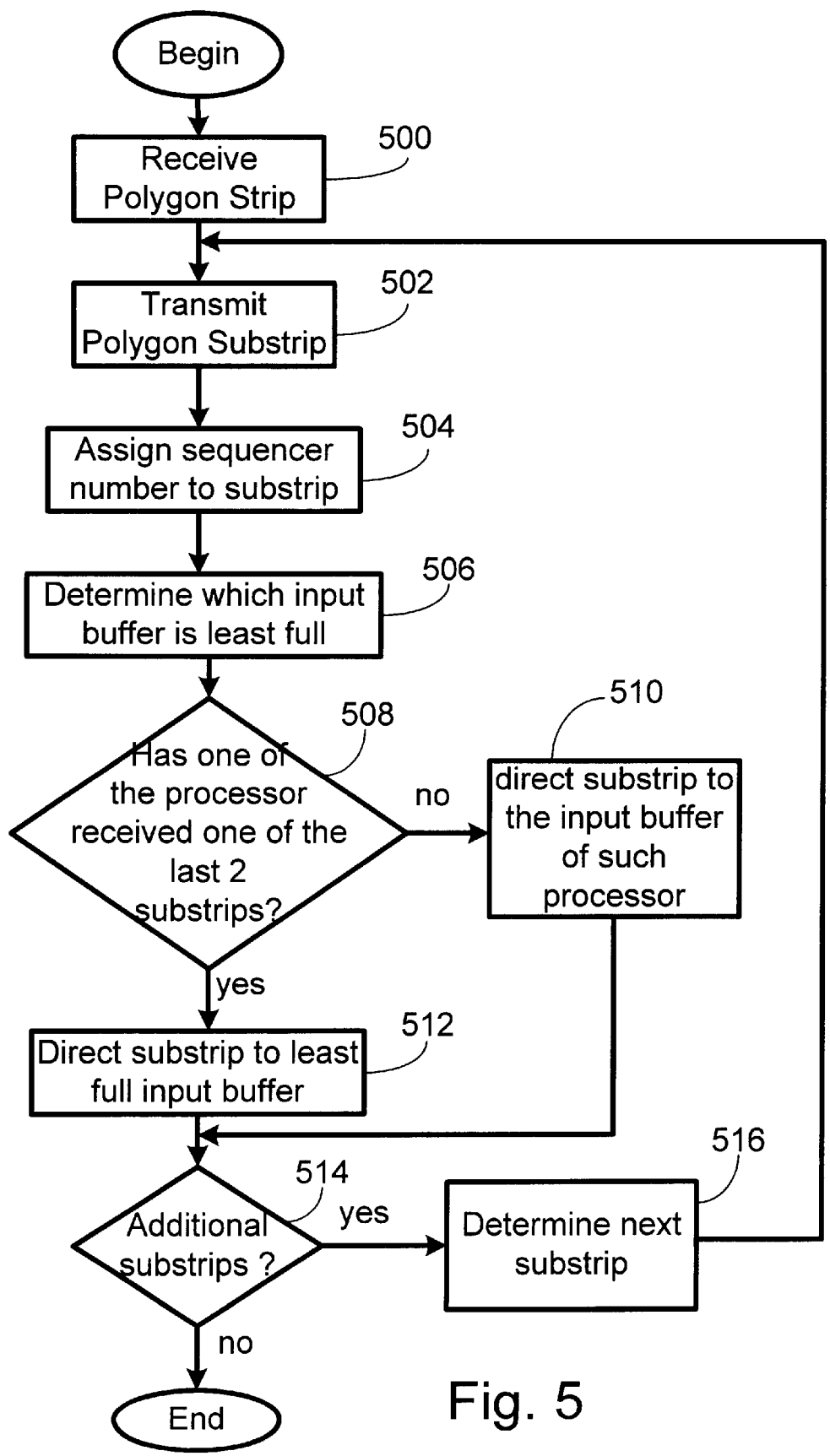
FIG. 5 shows a preferred process utilized by a breaker associated with a geometry accelerator for processing graphics request code having successive vertex data.

FIG. 5 shows a preferred process utilized by a breaker 400 associated with a geometry accelerator 202 for processing graphics request code having successive vertex data. The breaker 400 may either be a part of the geometry accelerator 202, or separate but coupled to the geometry accelerator 202. In preferred embodiments, each geometry accelerator 202 includes a dedicated breaker 400 for breaking successive vertex data. The successive vertex data preferably includes data for a plurality of vertices that may be considered to form a polygon strip (e.g., a triangle strip, which is a plurality of contiguous triangles). The process begins at step 500 in which a polygon strip is received by the strip breaker 400. The polygon strip preferably is transmitted to the breaker 400 from the host processor 104 via the receive bus 300.

The process continues to step 502 in which the breaker 400 determines a substrip of the polygon strip to transmit to one of the processors 404. In preferred embodiments, the breaker 400 is preconfigured to process certain substrips of the incoming polygon strip. Every geometry accelerator 202, via their respective breakers 400, is configured to process different substrips of the incoming polygon strip. It is preferred that no single substrip be processed by two different processors 404. By way of example, in the above noted two geometry accelerator system, breakers 400 for each geometry accelerator 202 alternatively process every other set of substrips defined by the incoming vertices.

The process continues to step 504 in which the breaker 400 assigns a sequence number to the substrip currently being processed. The sequence number preferably is added to a header associated with the substrip. In preferred embodiments, the breaker 400 maintains a counter that assigns a sequence number to each substrip processed by the breaker 400 in the order that the substrips were received. For example, the first substrip may be assigned sequence number one, the second substrip may be assigned substrip two, etc . . . . In preferred embodiments, the sequence number is assigned by means of a four bit counter.

The process then continues to step 506 in which the breaker 400 inspects each of the input buffers 402 to determine which buffer is least full. It then is determined at step 508 if each of the processors 404 has received one of the last two, raised to the n power substrips (i.e., $2^n$ substrips), where n is the number of bits of the counter. For example, in a system in which a four bit counter is utilized, it is determined if there are any processors 404 that have not received one of the previous sixteen substrips.

If it is determined at step 508 that one of the processors 404 has not received one of the last two raised to the n power substrips, then the process continues to step 510 in which the substrip being processed is directed to the input buffer 402 for such processor 404. Conversely, if the opposite conclusion is reached at step 508, then the process continues to step 512 in which the substrip is directed to the buffer having the least full input buffer 402. It then is determined at step 514 if there are any additional substrips for the geometry accelerator 202 to process. In one embodiment, this is accomplished through an end terminator signal. If there are no additional substrips, then the process ends. If, however, it is determined that there are additional substrips, then the breaker 400 determines which vertices define it, and the process loops back to step 500. Once the substrips are stored in the input buffers 402, they will be processed by their respective strip processors 404 and transmitted to their respective output buffers 406 for transmission to the rasterizer stage 204.

Figure 6:
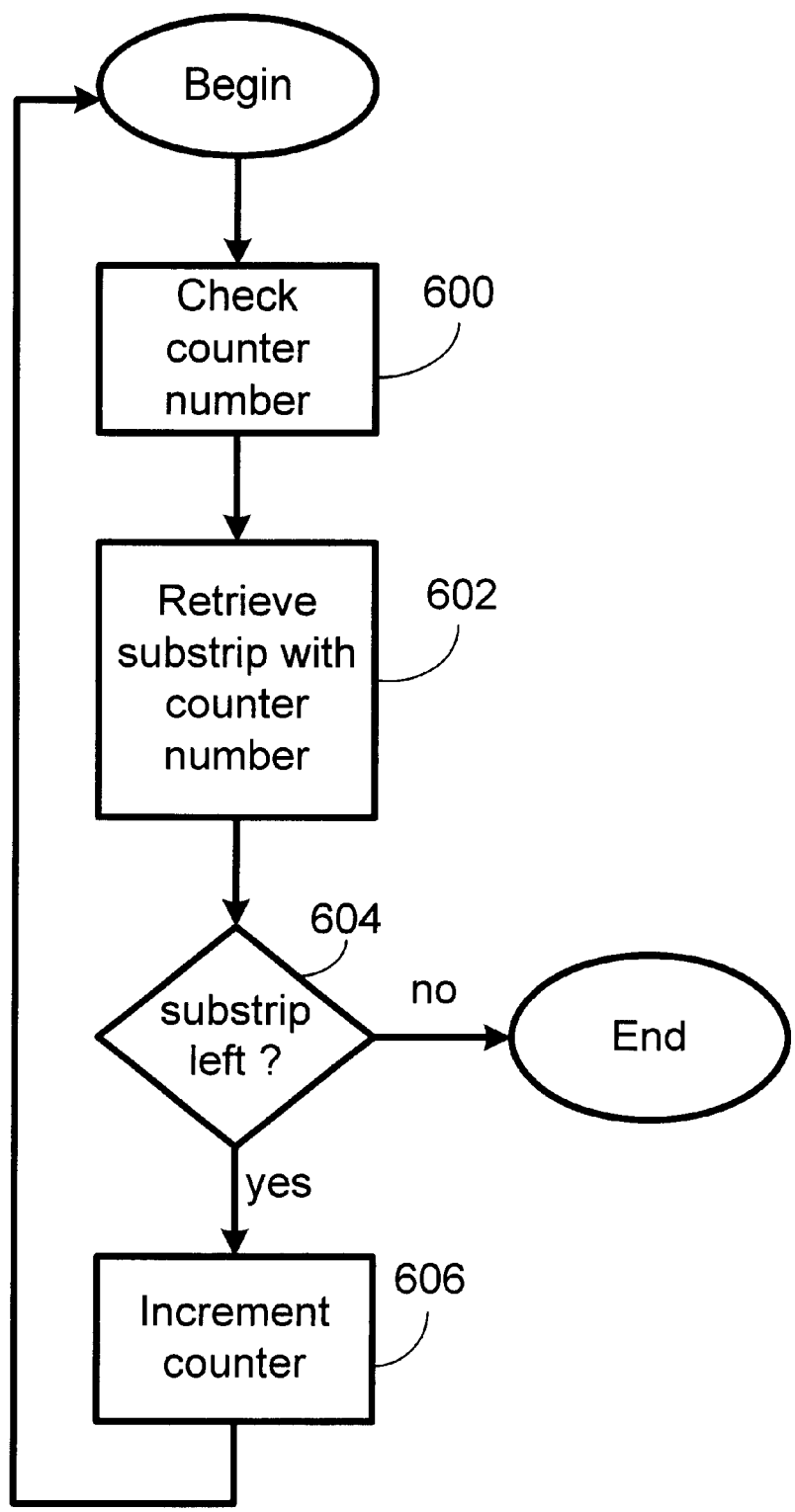
FIG. 6 shows a preferred process utilized by the sequencer in one geometry accelerator for sequencing substrips.

FIG. 6 shows a preferred process utilized by the sequencer 408 in one geometry accelerator 202 for sequencing substrips. The process begins at step 600 in which the sequencer 408 checks an internal counter for a current sequence number. In preferred embodiments, the sequencer 408 includes an internal four bit counter similar to the counter in the breaker 400. The sequencer 408 then inspects each output buffer 406 to determine if the substrip with the current sequence number is within one of the output buffers 406. If located, then it is retrieved and transmitted to the rasterizer stage 204 (step 602). In preferred embodiments, the sequencer 408 does not transmit a substrip out of order and thus, waits for the appropriately sequenced strip.

Figure 7:
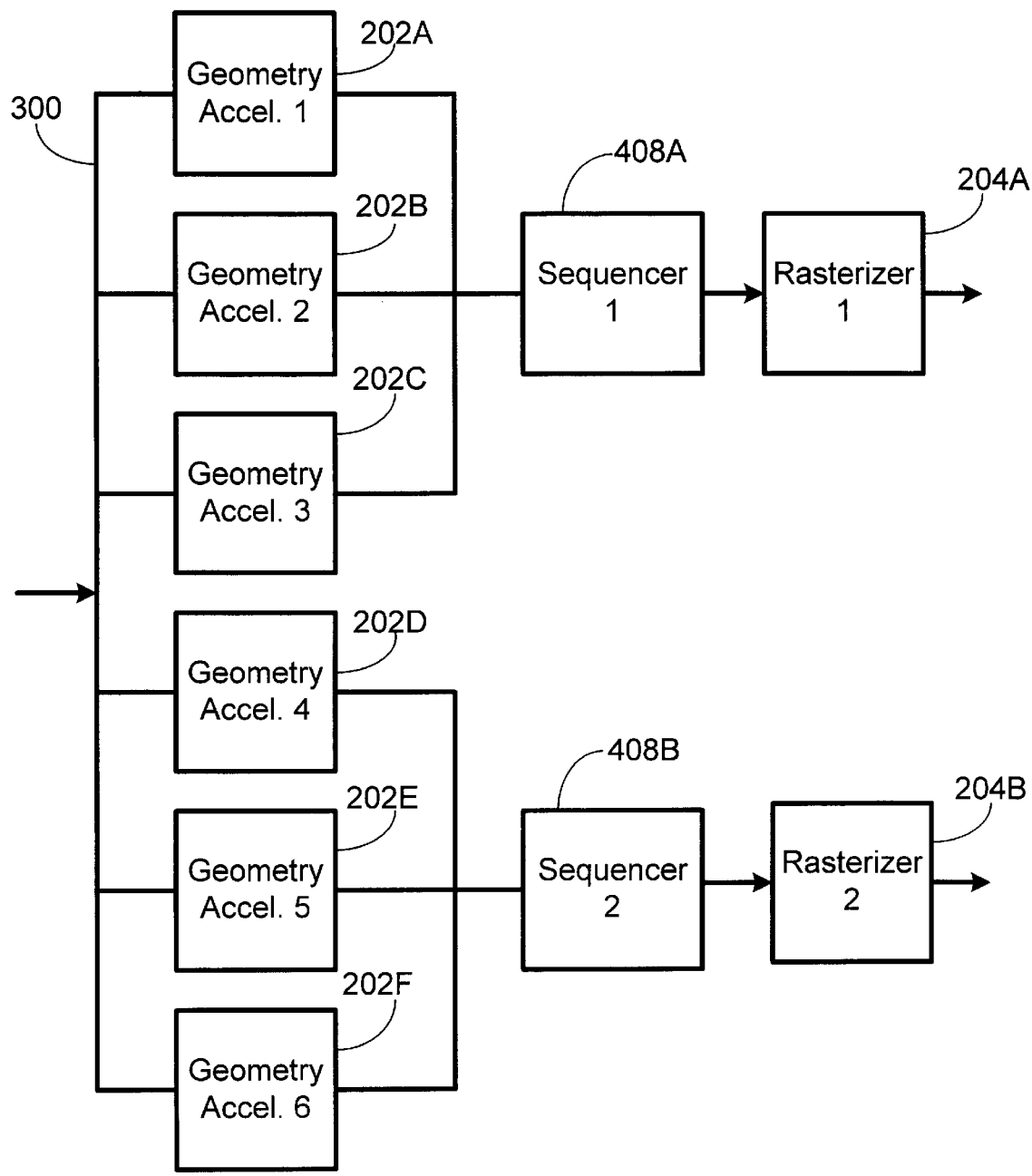
FIG. 7 shows an alternative embodiment in which a sequencer is placed between the geometry accelerator and the rasterizer.

It then is determined at step 604 if there are any additional substrips left in the strip for the geometry accelerator 202 to process. If such additional substrips exist, then the process continues to step 606 in which the counter is incremented. The process then loops back to step 600 in which the counter number is checked by the sequencer 408. If, however, it is determined at step 604 that no additional substrips remain, then the process ends. In an alternative embodiment the counter of the breaker of each geometry accelerator may be initially offset so that no two sequence numbers are identical in any geometry accelerator. In this alternative embodiment, as shown in FIG. 7 the sequencer 408 may be placed outside of the geometry accelerator 202 and in front of the rasterizer 204, so that, the sequencer is shared by multiple geometry accelerators 202.

Each of the breakers 400 in the geometry accelerator 202 preferably is configured to retrieve substrips in a manner that maximizes use of the accelerator elements. In the geometry accelerator 202 shown in FIG. 3, for example, it is preferred that every consecutive set of six consecutive substrips be retrieved by the breakers 400 in the following order:

first substrip: first geometry accelerator 202A;
second substrip: fourth geometry accelerator 202D;
third substrip: second geometry accelerator 202B;
fourth substrip: fifth geometry accelerator 202E;
fifth substrip: third geometry accelerator 202C; and
a sixth substrip: sixth geometry accelerator 202F.

Accordingly, in the next set of substrips, the first geometry accelerator 202A retrieves the seventh substrip, the fourth geometry accelerator 202D retrieves the second substrip, etc . . . . By distributing the polygon substrips in this sequence the substrips are alternately distributed between rasterizer 204A and 204B, thereby decreasing the probability of a processing bottleneck.

This preferred order of retrieving substrips may be implemented by any method known in the art. One method that may be used is to maintain first and second counters. When used with the system shown in FIG. 3, the first counter preferably is one bit long and is incremented every time a substrip is received by the breaker 400. The second counter in such an accelerator preferably is three bits and increments every "X" received substrips, where X equals the total number of rasterizers 204 in the system. Each of the geometry accelerators 202A–202F may be assigned an identification number that is the combination of the two counter values. Those skilled in the art can utilize the two counters to ensure that the above noted processing sequence is implemented.

Although various exemplary embodiments of the invention have been disclosed, it should be apparent to those skilled in the art that various changes and modifications can be made which will achieve some of the advantages of the invention without departing from the true scope of the invention. These and other obvious modifications are intended to be covered by the appended claims.

We claim:

1. A graphics accelerator for processing an incoming polygon strip, the graphics accelerator comprising:
    a first processor;
    a second processor;
    a first breaker coupled with the first processor for dividing the incoming polygon strip into a first set of substrips, the first breaker assigning a sequence number to each substrip in the first set of substrips;
    a second breaker coupled with the second processor for dividing the incoming polygon strip into a second set of substrips, the second breaker assigning a sequence number to each substrip in the second set of substrips; and
    a bus coupled with the first and second breakers for transmitting the incoming polygon strip to both the first breaker and the second breaker.

2. The graphics accelerator as defined by claim 1 wherein the first processor produces a first set of output substrips, the apparatus further comprising:
    a first sequencer for sequencing the first set of output substrips.

3. The graphics accelerator as defined by claim 2 wherein the first breaker includes a sequence number generator for applying a sequence number to each of the substrips in the first set of substrips.

4. The graphics accelerator as defined by claim 2 wherein the second processor produces a second set of output substrips, the apparatus further comprising:

a second sequencer for sequencing the second set of output substrips.

5. The graphics accelerator as defined by claim 1 wherein the first set of substrips and second set of substrips include no common substrips.

6. The graphics accelerator as defined by claim 1 wherein the first processor includes a plurality of first subprocessors, each of the first subprocessors having a current workload, the first breaker directing each of the substrips in the first set of substrips to the first subprocessors based upon the current workload of each of the plurality of first subprocessors.

7. The graphics accelerator as defined by claim 6 wherein the first breaker directs substrips to the first subprocessor with the smallest current workload.

8. The graphics accelerator as defined by claim 1 wherein the first breaker includes a counter for determining where to divide the incoming polygon strip for processing by the first processor.

9. The graphics accelerator as defined by claim 1 wherein the first breaker comprises:
an input for receiving the incoming polygon strip, the incoming polygon strip having first size;
an output for transmitting output data having a second size,
the first size being greater than the second size.

10. A graphics accelerator for processing an incoming polygon strip, the graphics accelerator comprising:
a first processor;
a second processor;
a first breaker coupled with the first processor for dividing the incoming polygon strip into a first set of substrips, the first breaker assigning a sequence number to each substrip in the first set of substrips, the first breaker having a first input for receiving the incoming polygon strip; and
a second breaker coupled with the second processor for dividing the incoming polygon strip into a second set of substrips, the second breaker assigning a sequence number to each substrip in the second set of substrips, the second breaker having a second input for receiving the incoming polygon strip.

11. The graphics accelerator as defined by claim 10 wherein the first set of substrips are different from the second set of substrips.

12. A graphics accelerator for processing an incoming polygon strip, the graphics accelerator comprising:
a plurality of strip processors; and
a plurality of breakers, each of the breakers receiving the incoming polygon strip,
each strip processor including a breaker for breaking the incoming polygon strip into a set of substrips and assigning a sequence number to each of substrips, each strip processor processing sets of substrips that are different than the sets of substrips processed by the other strip processors.

13. The graphics accelerator as defined by claim 12 wherein each of the breakers includes a sequencer for sequencing substrips in a preselected order.

14. The graphics accelerator as defined by claim 13 wherein the preselected order for a given strip processor is the order that the substrips are received by the given strip processor.

15. The graphics accelerator as defined by claim 12 wherein the plurality of strip processors are arranged in parallel.

16. A method for using a graphics accelerator having a plurality of breakers and a plurality of processors, the method comprising:
receiving a polygon strip in the graphics accelerator;
breaking the polygon strip into a first set of substrips in a first breaker;
breaking the polygon strip into a second set of substrips in a second breaker;
assigning a sequence number to each of substrips;
processing the first set of substrips in a first processor; and
processing the second set of substrips in a second processor.

17. The method according to claim 16, wherein the first set of substrips and the second set of substrips do not overlap.

18. The method according to claim 16, wherein the first breaker and the second break being capable of not assigning duplicate sequence numbers, further comprising:
reordering the substrips based on the sequence numbers in a sequencer.

19. The method according to claim 16, further comprising:
reordering the substrips of the first set of substrips based on the sequence number assigned to each substrip in a first sequencer coupled to the first processor; and
reordering the substrips of the second set of substrips based on the sequence number assigned to each substrip in a second sequencer coupled to the second processor.

20. A method for using a graphics accelerator having a plurality of processors, the method comprising:
receiving a polygon strip into each breaker of a plurality of breakers;
each breaker breaking the polygon strip producing multiple substrips;
each breaker assigning a sequence number to each substrip of the produced multiple substrips; and
each processor processing one of the produced multiple substrips.

21. The method according to claim 20, wherein in the step of breaking, the polygon strip is broken at predetermined positions.

22. The method according to claim 20, wherein each breaker is coupled to a plurality of associated processors. produced multiple substrips are processed.

23. A method according to claim 21, further comprising:
reordering the produced multiple substrips based on the sequence number after the produced multiple substrips are processed.

24. The method according to claim 22, wherein each processor has an associated input buffer, the method further comprising:
each breaker inspecting each input buffer of each associated processor to determine which buffer is least full;
directing a substrip to the least full buffer if each of the associated processors has received one of a predetermined number of substrips.

25. The method according to claim 24, wherein the predetermined number is based on a sequence number which is assigned to each substrip of the produced multiple substrips.

* * * * *